United States Patent
DeBruler et al.

(10) Patent No.: US 9,352,630 B2
(45) Date of Patent: May 31, 2016

(54) JOUNCE BUMPERS AND SPRING ASSEMBLIES INCLUDING SAME

(71) Applicant: Firestone Industrial Products Company, LLC, Indianapolis, IN (US)

(72) Inventors: Brian S. DeBruler, Noblesville, IN (US); Todd A. Chapman, San Jose, CA (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 41 days.

(21) Appl. No.: 14/015,053

(22) Filed: Aug. 30, 2013

(65) Prior Publication Data

US 2014/0061987 A1   Mar. 6, 2014

Related U.S. Application Data

(60) Provisional application No. 61/695,559, filed on Aug. 31, 2012.

(51) Int. Cl.
| | | |
|---|---|---|
| *B60G 11/22* | (2006.01) | |
| *B60G 11/62* | (2006.01) | |
| *B60G 15/06* | (2006.01) | |
| *F16F 1/36* | (2006.01) | |
| *F16F 13/00* | (2006.01) | |
| *F16F 13/06* | (2006.01) | |
| *F16F 13/20* | (2006.01) | |
| *B60G 15/12* | (2006.01) | |
| *F16F 9/32* | (2006.01) | |
| *F16F 9/58* | (2006.01) | |
| *F16F 9/04* | (2006.01) | |

(52) U.S. Cl.
CPC ............... *B60G 11/22* (2013.01); *B60G 11/62* (2013.01); *B60G 15/06* (2013.01); *B60G 15/12* (2013.01); *F16F 1/36* (2013.01); *F16F 9/049* (2013.01); *F16F 9/3292* (2013.01); *F16F 9/585* (2013.01); *F16F 13/002* (2013.01); *F16F 13/06* (2013.01); *F16F 13/20* (2013.01); *B60G 2204/111* (2013.01); *B60G 2204/125* (2013.01); *B60G 2204/1262* (2013.01); *B60G 2204/4502* (2013.01); *B60G 2204/45021* (2013.01)

(58) Field of Classification Search
CPC ...................... B60G 2204/11; B60G 2204/111; B60G 2204/112; F16F 2230/08; F16F 9/3292
USPC .................................. 267/220; 280/124.155
See application file for complete search history.

(56) References Cited

U.S. PATENT DOCUMENTS

| | | | | |
|---|---|---|---|---|
| 5,086,649 | A * | 2/1992 | Yamaoka | 73/117.03 |
| 5,226,635 | A * | 7/1993 | Nakamura | 267/220 |
| 6,053,488 | A * | 4/2000 | Forsbach et al. | 267/221 |
| 6,637,269 | B2 * | 10/2003 | Reck et al. | 73/627 |

FOREIGN PATENT DOCUMENTS

DE   102007020043 A1 * 10/2008 ............. F16F 9/084

* cited by examiner

*Primary Examiner* — Xuan Lan Nguyen
(74) *Attorney, Agent, or Firm* — Thomas R. Kingsbury; Fay Sharpe LLP (57) ABSTRACT

A jounce bumper can be dimensioned for securement along an end member of a gas spring assembly adjacent a sensing device. The jounce bumper can include a bumper body with a sensing passage extending their through such that the sensing device can communicate through the sensing passage. A gas spring assembly including a sensing device and such a jounce bumper as well as a suspension system including one or more of such gas spring assemblies are also included.

20 Claims, 7 Drawing Sheets

JOUNCE BUMPERS AND SPRING ASSEMBLIES INCLUDING SAME

This application claims priority from U.S. Provisional Patent Application No. 61/695,559 filed on Aug. 31, 2012, which is hereby incorporated herein by reference in its entirety.

BACKGROUND

The subject matter of the present disclosure broadly relates to the art of spring devices and, more particularly, to jounce bumpers configured for cooperative use with associated sensors as well as gas spring assemblies, non-gas (e.g., coil) spring assemblies and/or spring and damper assemblies including such a jounce bumper and one or more sensors. Suspension systems including one or more of such gas spring assemblies, non-gas spring assemblies and/or spring and damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies, non-gas (e.g., coil) spring assemblies and/or spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system and/or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Additionally, a variety of devices and/or arrangements have been and are currently used to affect control of the relative position of one structural component of the vehicle to another structural component. As one example, a mechanical linkage valve that is in fluid communication between a pressurized gas source and a gas spring assembly can be interconnected between the opposing structural components. As the structural components move toward and away from one another, the valve opens and closes to permit pressurized gas to be transferred into and out of the gas spring assembly. In this manner, such mechanical linkage valves can permit control of the height of the gas spring assembly.

Unfortunately, such arrangements have a number of problems and/or disadvantages that are commonly associated with the continued use of the same. One problem with the use of mechanical linkage valves, particularly those used in association with the suspension system of a vehicle, is that the linkages are frequently subjected to physical impacts, such as may be caused by debris from a roadway, for example. This can result in the linkage being significantly damaged or broken, such that the valve no longer operates properly, if the valve operates at all.

As an alternative to mechanical linkage sensors, non-contact sensors that utilize sound, pressure and/or electromagnetic waves traveling through a gas medium have been used in determining the relative position of one component to another. One advantage of such arrangements over mechanical linkages is that the non-contact sensors are often at least partially housed within the gas spring assembly, which can at least partially shelter the non-contact sensor from impacts and exposure. However, such non-contact sensors are typically directed toward a distal component that has a target that is suitable to reflect the sound, pressure and/or electromagnetic waves back to the sensor for determining the distance therebetween. In some cases, an unobstructed path between the non-contact sensors and the target of the distal component may be desired. However, gas spring assemblies often include one or more components, such as conventional jounce bumpers, for example, that are disposed therein and which may, in some cases, inhibit, at least partially shield or otherwise obstruct the non-contact sensor when located in a desired position.

As such, it is believed desirable to develop jounce bumper and gas spring assembly constructions that overcome the foregoing and/or other disadvantages of known designs, and/or otherwise advance the art of gas spring devices, such as, for example, by providing for improved performance and/or reduced cost of manufacture.

BRIEF SUMMARY

One example of a jounce bumper in accordance with the subject matter of the present disclosure can be dimensioned for securement along an associated end member of an associated spring assembly or spring and damper assembly adjacent an associated sensing device. The jounce bumper can include a bumper body having a longitudinal axis. The bumper body can include a mounting end, a distal end and an outer surface extending peripherally about the longitudinal axis between the mounting and distal ends. A sensing passage can extend through the bumper body between the mounting and distal ends such that the associated sensing device can communicate through the sensing passage.

One example of a spring assembly or spring and damper assembly in accordance with the subject matter of the present disclosure can include at least one of a spring element and a damper element having a longitudinal axis. A first end member can be disposed in operatively association with one of the spring element and the damper element. A second end member can be disposed in operative association with one of the spring element and the damper element in spaced relation to the first end member. A sensing device can be disposed in operative association with one of the spring element and the damper element. The sensing device can be capable of sensing a condition of the spring assembly or spring and damper assembly, such as acceleration, pressure, temperature and/or distance or height, for example. A jounce bumper can be supported along the one the spring element and the damping element adjacent the sensing device. The jounce bumper can include a bumper body having a longitudinal axis and including a mounting end, a distal end, and an outer surface extending peripherally about the bumper body between the mounting and distal ends. A sensing passage surface that at least partially defines a sensing passage can extend through the bumper body between the mounting and distal ends such that the sensing device can communicate through the sensing passage.

One example of a gas spring assembly or a gas spring and damper assembly in accordance with the subject matter of the present disclosure can include a flexible wall having a longitudinal axis and extending peripherally about the longitudinal axis between opposing first and second ends to at least partially define a spring chamber. A first end member can be secured across the first end of flexible wall such that a substantially fluid tight seal can be formed therebetween. A second end member can be disposed in spaced relation to the first end member and can be secured across the second end of the flexible wall such that a substantially fluid tight seal can be formed therebetween. A sensing device can be secured along one of the first and second end members. The sensing device can be capable of sensing a condition of the gas spring assembly, such as acceleration, pressure, temperature and/or distance or height, for example. A jounce bumper can be supported along the one of the first and second end members adjacent the sensing device. The jounce bumper can include a bumper body having a longitudinal axis and including a mounting end, a distal end, and an outer surface extending peripherally about the bumper body between the mounting and distal ends. A sensing passage surface that at least partially defines a sensing passage can extend through the bumper body between the mounting and distal ends such that the sensing device can communicate through the sensing passage.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source through the control device.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
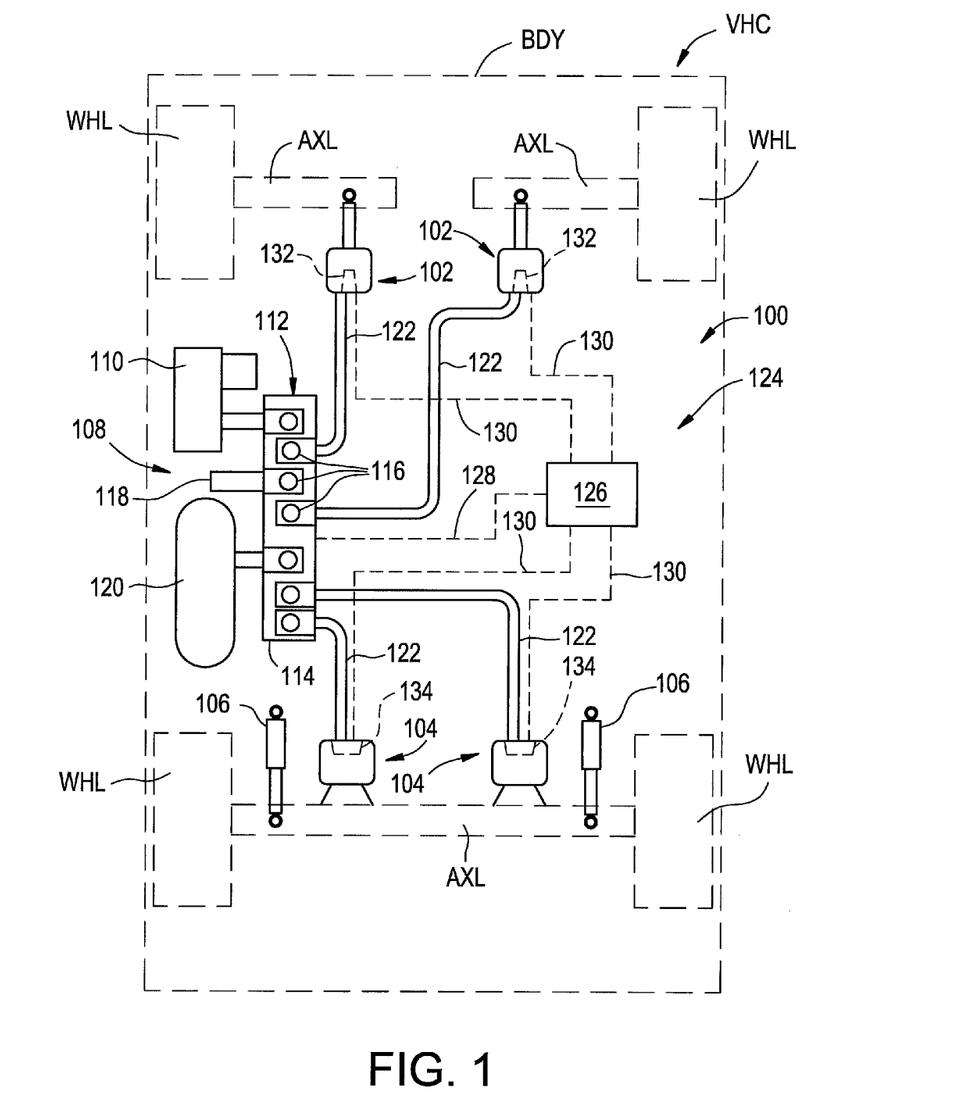
FIG. 1 is a schematic representation of one example of a suspension system of an associated vehicle including a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include a plurality of spring assemblies supported between the sprung and unsprung masses of the associated vehicle. Additionally, the suspension system of the vehicle can include a plurality of damping members that are operatively connected between the sprung and unsprung masses of the vehicle. In some cases, the spring assemblies (e.g., gas spring assemblies and/or coil spring assemblies) and damping members (e.g., shock absorbers and/or struts) may be provided as separate components. In other cases, however, the spring assemblies and damping members may be provided as spring and damper assemblies (e.g., gas spring over damper assemblies and/or coil spring over damper assemblies). In the arrangement shown in FIG. 1, for example, suspension system 100 includes two gas spring and damper assemblies 102 that are disposed toward opposing corners along one end of associated vehicle VHC adjacent a corresponding wheel WHL. Additionally, suspension system 100 includes two gas spring assemblies 104 and two dampers 106 that are provided separately from the gas spring assemblies. In the arrangement shown in FIG. 1, one gas spring assembly and one damper is operatively connected toward opposing corners along the opposing end of associated vehicle VHC adjacent a corresponding wheel.

It will be appreciated that any other suitable number of damping members, gas spring assemblies and/or gas spring and damper assemblies could alternately be used in any other configuration or arrangement. As shown in FIG. 1, gas spring and damper assemblies 102, gas spring assemblies 104 and dampers 106 are supported between axles AXL and body BDY of associated vehicle VHC. Additionally, it will be recognized that the gas spring assemblies shown and described in FIG. 1 (e.g., the gas springs of assemblies 102 and gas spring assemblies 104) are illustrated as being of a rolling lobe-type construction. It is to be understood, however, that gas spring assemblies of other types, kinds and/or constructions (e.g., convoluted bellows-type constructions) could alternately be used.

Suspension system 100 also includes a pressurized gas system 108 operatively associated with the gas spring assemblies for selectively supplying pressurized gas (e.g., air)

thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also optionally include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas spring and damper assemblies 102 and with gas spring assemblies 104 through suitable gas transfer lines 122. As such, pressurized gas can be selectively transferred into and/or out of the gas spring and damper assemblies and/or the gas spring assemblies through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102 and/or gas spring assemblies 104. Controller 126 can be of any suitable type, kind and/or configuration.

Control system 124 can also, optionally, include one or more sensing devices (not shown in FIG. 1), such as one or more acceleration sensors, one or more pressure sensors, one or more temperature sensors, one or more height or distance sensors or any combination of any one or more thereof, for example. As non-limiting examples, such sensing devices can include one or more non-contact sensing devices that can be operatively associated with the gas spring assemblies and/or gas spring and damper assemblies, and capable of outputting or otherwise generating data, signals and/or other communications having a relation to acceleration, gas pressure, temperature and/or height of one or more of the assemblies or a distance between other components of the vehicle. Such sensing devices can be in communication with ECU 126, which can receive the data, signals and/or other information (e.g., height or distance signals) therefrom. The one or more sensing devices can be in communication with ECU 126 in any suitable manner, such as through conductors or leads 130, for example. Additionally, it will be appreciated that the sensing devices can be of any suitable type, kind and/or construction, such as may operate using sound, pressure, light and/or electromagnetic waves, for example.

One or more of the gas spring and gas damper assemblies and/or the gas spring assemblies of suspension system 100 can also include a jounce bumper in accordance with the subject matter of the present disclosure used in operative association with a corresponding one or more of the non-contact sensing devices. For example, gas spring and gas damper assemblies 102 are shown in FIG. 1 as including jounce bumpers 132, which can be disposed in operative associate with one of more sensing devices (not shown in FIG. 1) and constructed in accordance with the subject matter of the present disclosure. As another example, gas spring assemblies 104 are shown in FIG. 1 as including jounce bumpers 134, which can be disposed in operative associate with one of more sensing devices (not shown in FIG. 1) and constructed in accordance with the subject matter of the present disclosure.

Having described an example of a suspension system (e.g., suspension system 100) that can include a gas spring and damper assembly and/or a gas spring assembly in accordance with the subject matter of the present disclosure, one example of such a gas spring and damper assembly will now be described in connection with FIGS. 2-5. It will be recognized and understood, however, that the following description of the subject matter of the present disclosure is equally applicable to other types and kinds of gas spring constructions, such as gas spring assemblies 104, for example.

One example of a gas spring and damper assembly 200, such as may be suitable for use as a gas spring and damper assembly 102 in FIG. 1, for example, is shown in FIGS. 2-5 and can include a damper assembly 202 and a gas spring assembly 204 that is operatively connected with the damper assembly. It will be appreciated that, in use, gas spring and damper assembly 200 can undergo changes in length (i.e., can be displaced between extended and collapsed conditions) as a suspension system within which one or more assemblies are installed dynamically moves to accommodate forces and/or inputs, such as forces and/or inputs acting on a vehicle, for example.

Figure 2:
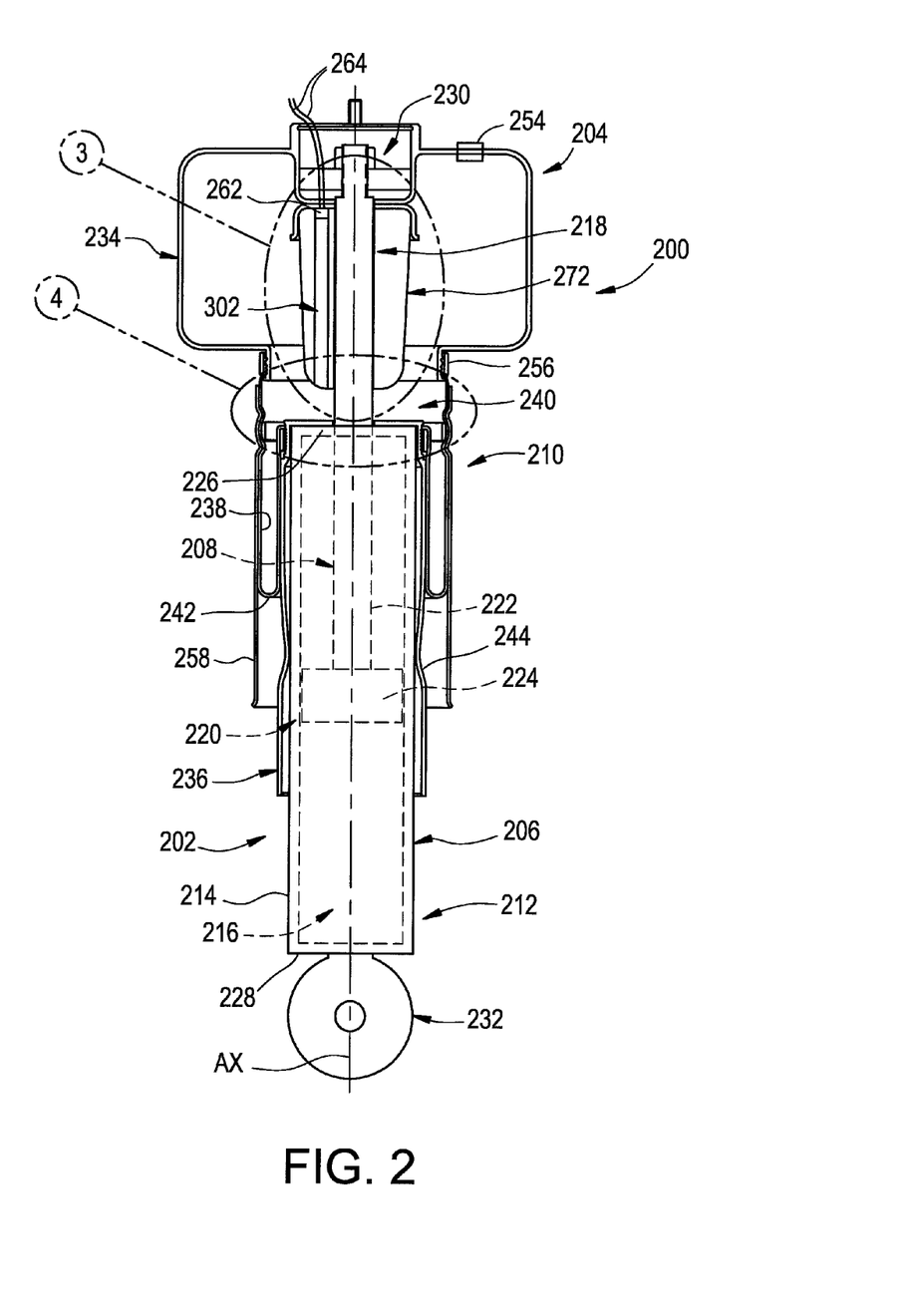
FIG. 2 is a side view, in partial cross section, of one example of a gas spring and damper assembly that includes a sensing device and one example of a jounce bumper in accordance with the subject matter of the present disclosure.

Damper assembly 202 is shown in FIGS. 2-5 as having an axis AX and including a damper housing 206 and a damper rod assembly 208 that is at least partially received in the damper housing. Damper housing 206 extends axially between opposing housing ends 210 and 212, and includes a housing wall 214 that at least partially defines a damping chamber 216 (FIG. 2). Damper rod assembly 208 extends lengthwise between opposing ends 218 and 220 and includes an elongated rod 222 and a damper piston 224 disposed along end 220 of damper rod assembly 208. Damper piston 224 is received within damping chamber 216 of damper housing 206 for reciprocal movement along the housing wall in a conventional manner. A quantity of damping fluid (not shown) can be disposed within damping chamber 216 and damper piston 224 can be displaced through the damping fluid to dissipate kinetic energy acting on gas spring and damper assembly 200.

Housing wall 214 can form an opening (not shown) along housing end 210. A damper end wall 226 (FIG. 4) can extend across the opening and can be secured on or along housing wall 214 such that a substantially fluid-tight connection is formed therebetween. Damper end wall 226 can include an opening (not shown) and elongated rod 222 can extend axially-outward from damping chamber 216 through the opening in a direction opposite housing end 212. Additionally, a damper end wall 228 can be connected across end 212 of damper housing 206 such that a substantially fluid-tight connection is formed therebetween.

Elongated rod 222 projects outwardly from damper end wall 226 such that end 218 of the elongated rod is outwardly exposed from the damper housing and is accessible for securement of one or more associated components and/or devices. A connection feature 230, such as a plurality of threads, for example, can be provided on or along the elongated rod for use in operatively connecting gas spring and damper assembly 200 to an associated vehicle structure or to a component of gas spring assembly 204, such as is shown in FIG. 2, for example. Damper assembly 202 also includes a connection feature 232, such as a pivot or bearing mount, for example, that is operatively disposed along damper housing 206 and is adapted to operatively connect damper housing 206 to an associated vehicle structure.

Gas spring assembly 204 includes an end member 234, such as a top cap, bead plate or reservoir enclosure, for example. Gas spring assembly 204 also includes an end member 236, such as a roll-off piston, for example, that is disposed in axially-spaced relation to end member 234. A flexible wall, such as an elongated flexible sleeve 238, for example, can be operatively connected between end members 234 and 236 in a substantially fluid-tight manner such that a spring chamber 240 is at least partially defined therebetween. In some cases, flexible sleeve 238 can form a rolling lobe 242 that is displaced along an outer surface 244 of end member 236 as gas spring and damper assembly 200 moves between extended and compressed conditions.

Figure 4:
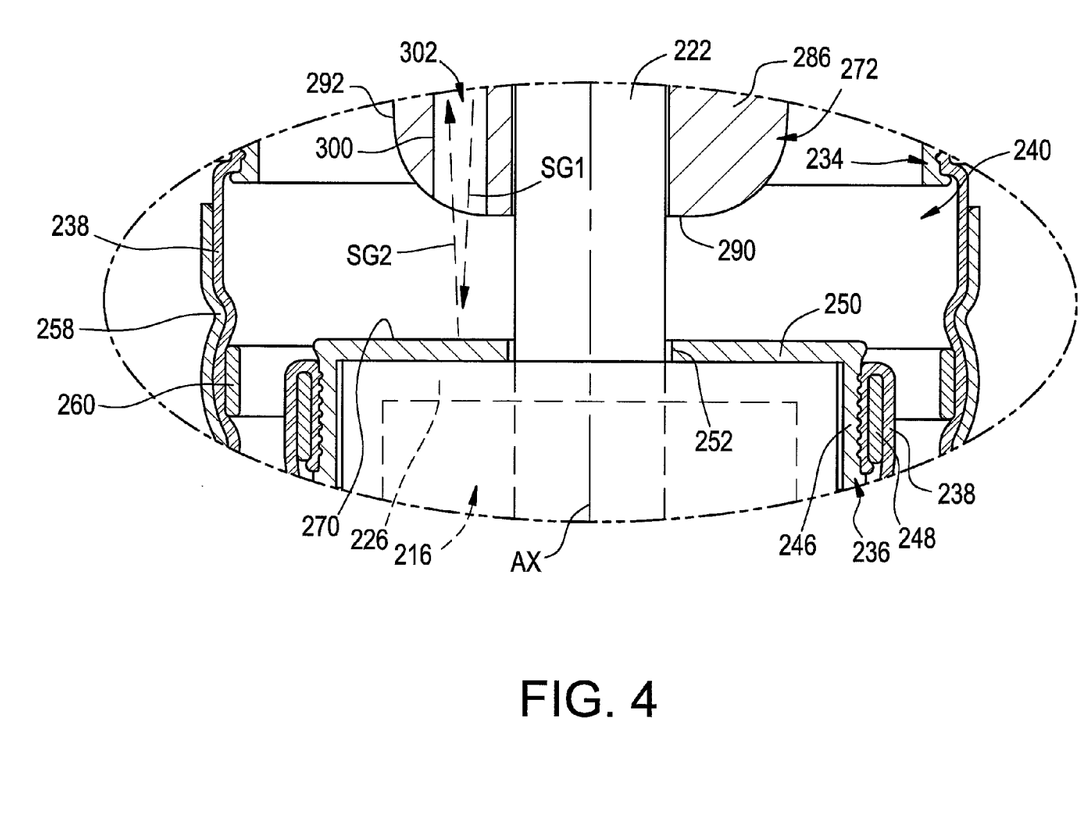
FIG. 4 is an enlarged view of the portion of the assembly and jounce bumper identified as Detail 4 in FIG. 2.

As identified in FIG. 4, end member 236 can include a wall portion 246 along which one end of flexible sleeve 238 is operatively connected, such as, for example, through the use of a retaining ring 248 that can be crimped radially-inward or otherwise deformed to form a substantially fluid-tight connection therebetween. End member 236 can also include a wall portion 250 that projects radially-inward from wall portion 246. In some cases, end member 236 can be fit over or otherwise receive at least a portion of damper housing 206 such that wall portion 250 engages end wall 226 of the damper housing, such as to support the end member on the damper housing. A passage wall 252 at least partially defines a passage (not numbered) that extends through end member 236 and is dimensioned to permit elongated rod 222 to pass therethrough. In such case, elongated rod 222 can slidably translate into and out of the gas spring assembly through end member 236. Additionally, a gas transfer passage or port 254 can extend through end member 234 such that fluid communication into and out of spring chamber 240 can be achieved. Port 254 can be adapted to receive a suitable connector fitting (not shown), such as may be suitable for operatively connecting gas transfer lines 122 (FIG. 1) to the gas spring and damper assembly.

The opposing end of flexible sleeve 238 can be secured on or along end member 234 in any suitable manner. As one example, a portion of the flexible sleeve can be secured in abutting engagement along a wall portion of end member 234, such as by way of a retaining ring 256 that can be crimped radially inward or otherwise deformed to form a substantially fluid-tight connection therebetween. Additionally, gas spring and damper assembly 200 can, optionally, include an external sleeve or support, such as a restraining cylinder 258, for example, that can be secured on or along the flexible sleeve in any suitable manner. As one example, a portion of the flexible sleeve can be secured in abutting engagement along a wall portion of restraining cylinder 258 by way of a retaining ring 260 that can be crimped radially outward or otherwise deformed to form an engagement between the restraining cylinder and the flexible sleeve. It will be appreciated, however, that other arrangements could alternately be used.

Gas spring and damper assembly 200 can also include a non-contact sensing device 262 that is disposed within spring chamber 208 and operative to output or otherwise generate signals, data and/or other information having a relation to one or more properties and/or characteristics associated with the assembly and/or one or more components thereof. As non-limiting examples, such one or more properties and/or characteristics can include acceleration, gas pressure, temperature and/or a relative distance or height of the gas spring and damper assembly. It will be appreciated that sensing device 260 can be of any suitable type, kind, configuration and/or construction, and that the sensing device can be supported on or along the gas spring and damper assembly in any suitable manner. In some cases, sensing device 262 can be communicatively coupled with a control system or a component thereof, such as ECU 126 of control system 124, for example, in any suitable manner. As one example, sensing device 262 can include one or more electrical conductors or leads 264, such as may operate as leads 130 in FIG. 1, for example. Also, it will be appreciated that sensing device 262 function in any suitable manner and according to any suitable principles of operation. As one example, the sensing device could transmit and receive ultrasonic waves. As another example, the sensing device could include one or more components that communicate using electromagnetic waves, such as radio-frequency identification communications or infrared waves, for example.

Figure 3:
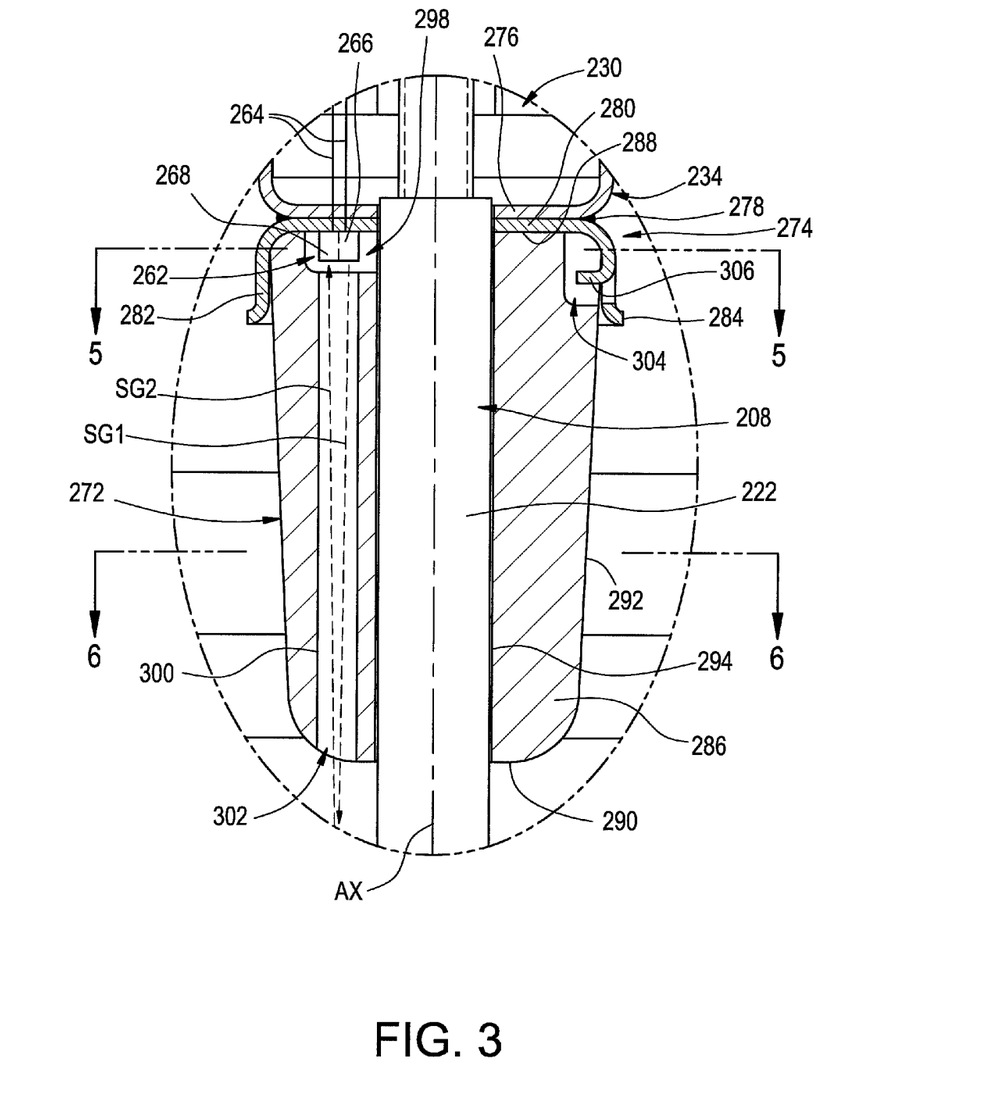
FIG. 3 is an enlarged view of the portion of the assembly, sensing device and jounce bumper identified as Detail 3 in FIG. 2.

In the arrangement shown in FIGS. 2 and 3, sensing device 262 includes a transmitting portion 266 and a receiving portion 268. Transmitting portion 266 can include a transmitter or other wave generator operative to broadcast electromagnetic waves, such as waves having a frequency within a range of approximately 30 kHz to approximately 790 THz, for example. Receiving portion 268 can include a receiver or other wave receptor operative to receive electromagnetic waves within such a range of frequencies. In the arrangement shown in FIGS. 2-5, for example, transmitting portion 266 is shown broadcasting signals, which are represented by arrow SG1, that are directed toward an outer surface 270 of wall portion 250 and reflected back to receiving portion 268, such as is represented by arrow SG2.

As indicated above, it will be appreciated that a jounce bumper in accordance with the subject matter of the present disclosure can be configured for cooperative use in operative association with one or more sensing devices (e.g., sensing device 262) in connection with spring assemblies and/or spring and damper assemblies of any suitable type, kind and/or configuration. For example, a jounce bumper in accordance with the subject matter of the present disclosure could be used in operative association with a spring and damper assembly that includes a coil spring disposed between opposing end members and connected to an otherwise conventional hydraulic damper. Such constructions are commonly referred to in the art as coil over damper assemblies or over damper coil springs.

As another example, gas spring and damper assembly 200 can include a jounce bumper in accordance with the subject matter of the present disclosure that is configured for cooperative use in operative association with one or more sensing devices (e.g., sensing device 262). One example of such a jounce bumper is shown in FIGS. 2-5 as a jounce bumper 272 that is disposed within spring chamber 208. It will be appreciated that the jounce bumper can be supported on or along any one or more components of damper assembly 202 and/or gas spring assembly 204, in any suitable manner. For example, in the arrangement shown in FIGS. 2-5, assembly 200 includes a jounce bumper mount 274 that is secured along a wall portion 276 of end member 234, such as by way of a flowed-material joint 278, for example. Jounce bumper mount 274 includes a base wall 280 and a side wall 282 that extends from along the base wall to an outer peripheral edge 284. In some cases, jounce bumper mount 274 can have a somewhat cup-shaped configuration that includes a cavity (not numbered) that is at least partially defined by base wall 280 and side wall 282 and is dimensioned to receive at least a portion of jounce bumper 272.

Jounce bumper 272 includes a bumper body 286 that extends between a first or mounting surface 288 and a second or distal surface 290 with an outer side surface 292 extending longitudinally therebetween. In some cases, a rod passage surface 294 can extend longitudinally through jounce bumper 272 to at least partially define a rod passage 296 (FIG. 6) through which damper rod 222 can extend. In some cases, a sensor recess 298 can be formed into bumper body 286, such as along mounting surface 288, for example. If provided, sensor recess 298 is preferably dimensioned to permit sensing device 262 to be at least partially receive within the bumper body.

Jounce bumper 272 also includes a sensing passage surface 300 that at least partially defines a sensing passage 302 that extends through at least a portion of bumper body 286. In a preferred arrangement, sensing passage 302 is disposed in communication with sensing device 262 such that the sensing device can be exposed to properties and/or characteristics being sensed and/or such that signals or waves broadcast or otherwise transmitted from and/or received by the sensing device can be communicated through the sensing passage toward or from a distal feature or component (e.g., outer surface 270 of wall portion 250) that would otherwise be obscured by the jounce bumper.

Figure 5:
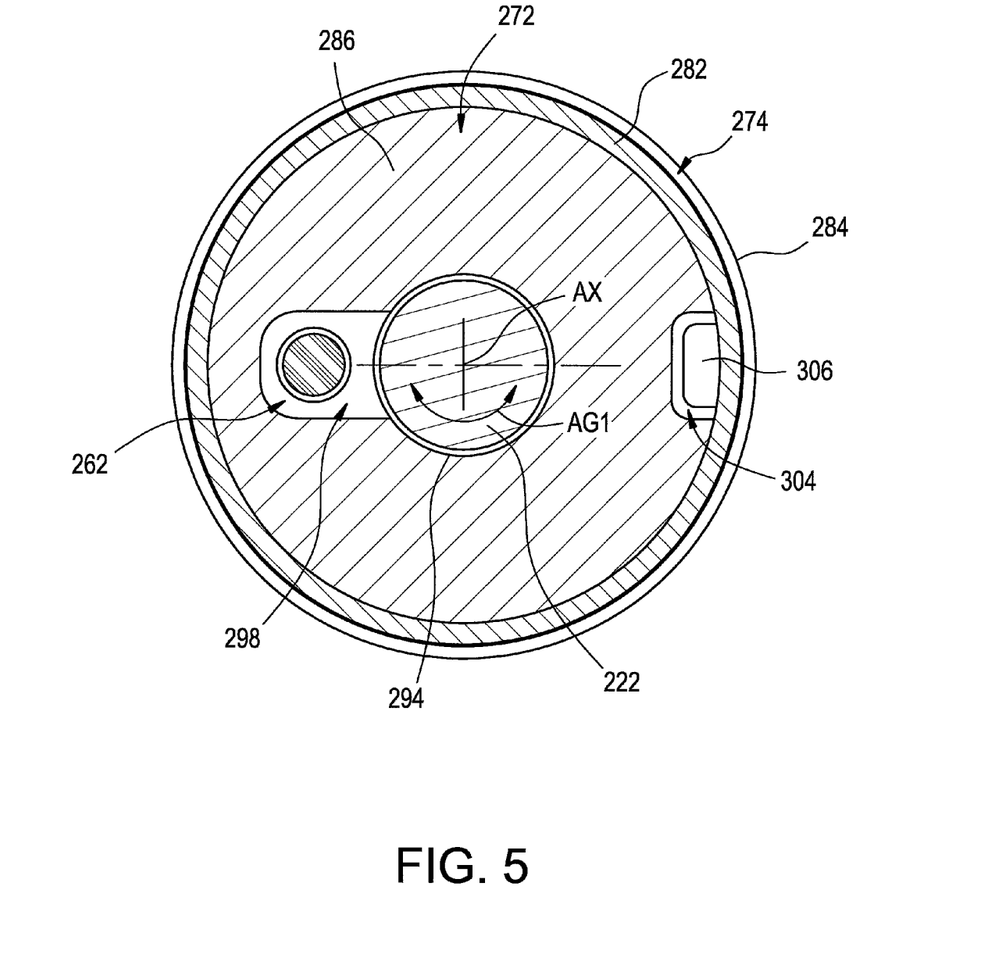
FIG. 5 is a cross-sectional plan view of the assembly, sensing device and jounce bumper in FIGS. 2-4 taken from along line 5-5 in FIG. 3.
Figure 6:
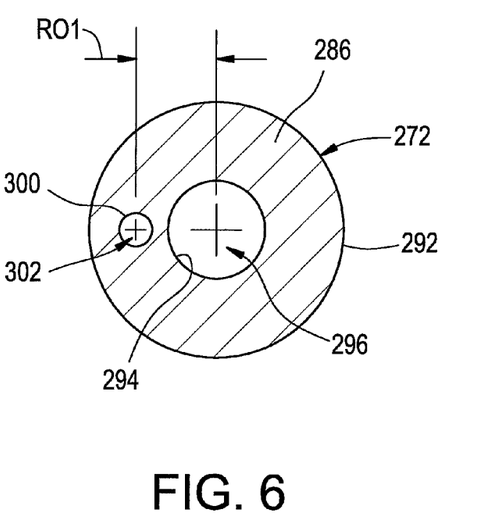
FIG. 6 is a cross-sectional plan view of the jounce bumper in FIGS. 2-5 taken from along line 6-6 in FIG. 3.
Figure 7:
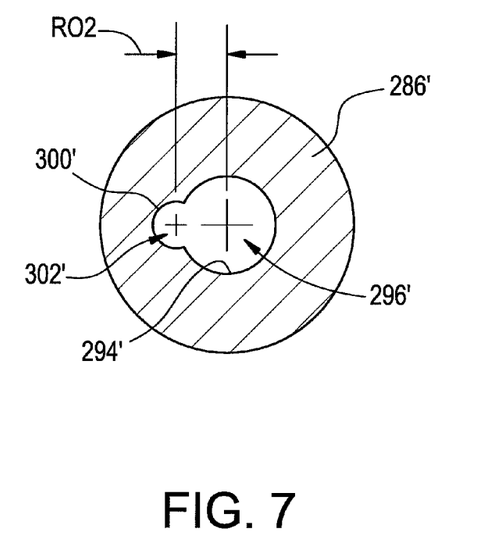
FIG. 7 is a cross-sectional plan view of an alternate configuration of the jounce bumper in FIGS. 2-6.

It will be appreciated that sensing passage 302 can be of any suitable size, shape, configuration and/or orientation. In the arrangement shown in FIGS. 2-6, for example, sensing passage surface 300 has a generally cylindrical shape. Additionally, sensing passage 302 is disposed in radially-offset relation to the rod passage, such as is represented in FIG. 6 by reference dimension RO1, for example, with the sensing passage being fully defined within bumper body 286. One example of an alternate arrangement is shown in FIG. 7 in which bumper body 286' includes a sensing passage surface 300' that at least partially defines a sensing passage 302' in communication with rod passage 296' that is defined by rod passage surface 294'. In such an alternate arrangement, passage 302' is radially-offset from passage 296', as is represented in FIG. 7 by reference dimension RO2, by a lesser distance than radial-offset dimension RO1 of passages 296 and 302 in FIGS. 2-6. In this manner, passages 296' and 302' together define a non-circular passage through bumper body 286'.

Figure 8:
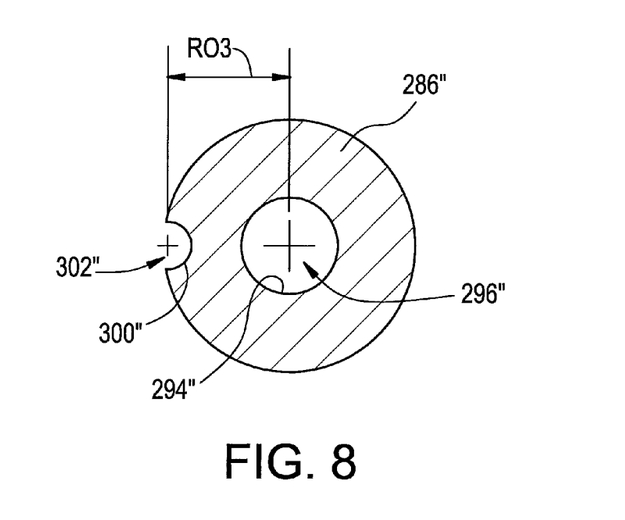
FIG. 8 is a cross-sectional plan view of another alternate configuration of the jounce bumper in FIGS. 2-6.
Figure 9:
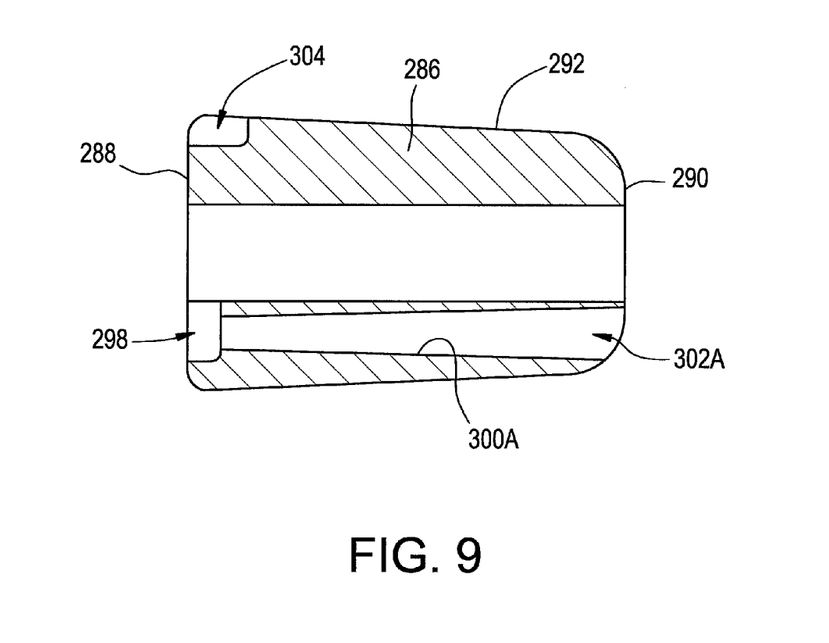
FIG. 9 is a cross-sectional plan view of a further alternate configuration of the jounce bumper in FIGS. 2-6.

Another example of an alternate arrangement of a jounce bumper in accordance with the subject matter of the present disclosure is shown in FIG. 8 in which bumper body 286" includes a sensing passage surface 300" that at least partially defines a sensing passage 302". In such an alternate arrangement, passage 302" is radially-offset from passage 296", as is represented in FIG. 8 by reference dimension RO3, by a distance greater than radial-offset dimension RO1 of passages 296 and 302 in FIGS. 2-6. In this manner, passage 302" can form an elongated slot or groove extending in a longitudinal direction along outer side surface 292" of bumper body 286". A further example of an alternate arrangement of a jounce bumper in accordance with the subject matter of the present disclosure is shown in is shown in FIG. 9 in which bumper body 286 includes a sensing passage surface 300A that at least partially defines a sensing passage 302A that has a tapered or frustoconical cross-sectional shape. It will be appreciated, however, that passages of other sizes, shapes, configurations and/or arrangements could alternately be used.

It will be appreciated that jounce bumper 272 is oriented within spring chamber 240 such that the sensing passage thereof (e.g., sensing passage 302, 302', 302" and/or 302A) is disposed in approximate alignment with sensing device 262. In such an arrangement, properties and/or characteristics being sensed and/or signals broadcast from and/or received by sensing device 262 can be communicated or otherwise transmitted through the sensing passage, such as has been described above. As such, it may, in some cases, be beneficial to provide one or more features and/or combination of features operative to index or otherwise orient and maintain sensing passage 302 in approximate alignment with the sensing device. In such cases, one or more indexing features can be included on or along the jounce bumper and used in combination with a corresponding number of one or more indexing features on another component of the gas spring and damper assembly (e.g., gas spring and damper assembly 200). In a preferred arrangement, one or more of the indexing features can be disposed in a predetermined axial and/or rotational orientation relative to the sensing device and/or a sensor recess (e.g., sensor recess 298), such as is represented in FIG. 5 by angular dimension AG1. It will be appreciated that such a predetermined orientation can have a distance and/or angle within any suitable range of distance and/or angles.

As one example of such an arrangement, jounce bumper 272 is shown as including an indexing recess 304 that extends into bumper body 286 from along mounting surface 288 and/or outer side surface 292. Additionally, jounce bumper mount 274 is shown as including a tab 306 that extends radially inward from along side wall 282, and is received within indexing recess 304, such as to inhibit or at least minimize rotation of the jounce bumper relative to sensing device 262, for example. It will be appreciated, however, that other configurations and/or arrangements could alternately be used.

Though shown and described herein in use in connection with a gas spring and damper assembly, it will be recognized and understood that a jounce bumper in accordance with the subject matter of the present disclosure can be used in connection with gas spring devices of other types, kind and/or constructions. As non-limiting examples, a jounce bumper in accordance with the subject matter of the present disclosure could be used on or in connection with gas spring assemblies, such as a rolling lobe-type constructions and/or convoluted bellow-type constructions.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An assembly comprising:
   a spring element having a longitudinal axis and extending longitudinally between opposing first and second ends;
   a first end member disposed in operative engagement with said spring element along said first end and including an indexing feature disposed therealong;
   a second end member disposed in operative engagement with said spring element along said second end;
   a sensing device secured in a predetermined position along one of said first and second end members, said sensing device operative to transmit one of an ultrasonic wave and an electromagnetic wave toward a distal surface and receive said one of said ultrasonic wave and said electromagnetic wave reflected off of said distal surface to at least partially sense a height condition of said assembly; and,
   a jounce bumper supported along said one of said first and second end members in spaced relation to said distal surface and at least partially covering said sensing device, said jounce bumper including a bumper body having a longitudinal axis and including a mounting end, a distal end, and an outer surface extending peripherally about said bumper body between said mounting and distal ends, and said bumper body including a sensing passage surface that at least partially defines a sensing passage extending through said bumper body between said mounting and distal ends and an indexing recess extending into said bumper body and dimensioned to at least partially receive said indexing feature such that said sensing device transmits said one of said ultrasonic wave and said electromagnetic wave and receives said reflection of said one of said ultrasonic wave and said electromagnetic wave through said sensing passage.

2. An assembly according to claim 1 further comprising a damper including a damper housing and a damper rod, said damper rod operatively connected along one of said first and second end members, and said damper housing operatively connected along the other of said first and second end members.

3. An assembly according to claim 2, wherein said bumper body includes an inner surface that at least partially defines a rod passage extending through said bumper body in approximate alignment with said longitudinal axis and dimensioned to receive said damper rod.

4. An assembly according to claim 1, wherein said indexing recess is disposed in a predetermined orientation relative to said sensing device such that said sensing passage is positioned and retained in approximate alignment with said sensing device.

5. An assembly according to claim 1, wherein said jounce bumper includes a sensing device recess extending into said bumper body and dimensioned to receive at least a portion of said sensing device.

6. An assembly according to claim 1, wherein said spring element includes a flexible wall extending peripherally about said longitudinal axis and at least partially defining a spring chamber, said first end member is secured across said first end of said flexible wall such that a substantially fluid-tight seal is formed therebetween, and said second end member is secured across said second end of said flexible wall such that a substantially fluid-tight seal is formed therebetween.

7. An assembly according to claim 6, wherein one of said first and second end members includes an outside surface, and said flexible wall at least partially defines a rolling lobe displaceable along said outside surface.

8. An assembly according to claim 1, wherein said jounce bumper includes said bumper body that is at least partially formed from an elastomeric material that substantially inhibits at least one of transmission and reception of said one of said ultrasonic wave and said electromagnetic wave therethrough.

9. A gas spring assembly comprising:
   a first end member including a first end member wall and including an indexing feature;
   a second end member spaced from said first end member such that a longitudinal axis is formed therebetween;
   a flexible spring member includes a flexible wall extending peripherally about said longitudinal axis and lengthwise between first and second end with said first end operatively connected to said first end member in a substantially fluid-tight manner and said second end operatively connected to said second end member in a substantially fluid tight manner such that a spring chamber is at least partially defined by said flexible spring member between said first and second end members;

a sensing device secured on said first end member in a predetermined position relative to said indexing feature and said sensing device operative to transmit one of an ultrasonic wave and an electromagnetic wave toward a reflecting surface disposed along said second end member and receive said one of said ultrasonic wave and said electromagnetic wave reflected off of said reflecting surface to at least partially sense a height condition of said gas spring assembly; and, a jounce bumper includes a bumper body supported along said first end member in spaced relation to said second end member and said reflecting surface, said jounce bumper at least partially covering said sensing device along said first end member, said jounce bumper having a longitudinal axis and including:
 a mounting end disposed toward said first end member;
 a distal end spaced apart from said first end member and said second end member;
 an outer surface extending peripherally about said jounce bumper between said mounting and distal ends;
 a sensing passage surface that at least partially defines a sensing passage extending through said bumper body between said mounting and distal ends; and
 an indexing recess dimensioned to at least partially receive said indexing feature and at least approximately align said sensing passage with said sensing device such that said sensing device transmits said one of said ultrasonic wave and said electromagnetic wave and receives said reflection of said one of said ultrasonic wave and said electromagnetic wave through said sensing passage.

10. A gas spring assembly according to claim 9, wherein said jounce bumper includes said bumper body that is at least partially formed from an elastomeric material that substantially inhibits at least one of transmission and reception of said one of said ultrasonic wave and said electromagnetic wave therethrough.

11. A gas spring assembly according to claim 9, wherein said jounce bumper includes a includes a sensing device recess disposed along said mounting end and in communication with said sensing passage, said sensing device recess dimensioned to at least partially receive and cover said sensing device.

12. A gas spring assembly according to claim 9, wherein said indexing recess extends into said jounce bumper from along said mounting end.

13. A gas spring assembly according to claim 9, wherein said sensing passage extends along said outer surface of said jounce bumper and at least partially forms an elongated groove along said outer surface.

14. A gas spring assembly according to claim 9, wherein one of said first and second end members includes an outside surface, and said flexible wall at least partially defines a rolling lobe displaceable along said outside surface.

15. A gas spring and damper assembly comprising:
 a gas spring including:
  a first end member including a first end member wall and an indexing feature;
  a second end member spaced from said first end member such that a longitudinal axis is formed therebetween; and,
  a flexible spring member extending peripherally about said longitudinal axis and lengthwise between first and second end with said first end operatively connected to said first end member in a substantially fluid-tight manner and said second end operatively connected to said second end member in a substantially fluid tight manner such that a spring chamber is at least partially defined by said flexible spring member between said first and second end members;
 a damper including:
  a damper rod assembly including a damper rod and a damper piston, said damper rod extending lengthwise between a first end operatively connected to said first end member and a second end along which said damper piston is disposed; and,
  a damper housing including a housing wall that at least partially defines a damping chamber dimensioned to receive said damper piston and at least a portion of said damper rod, said damper housing operatively connected to said second end member;
 a sensing device secured on said first end member in a predetermined position relative to said indexing feature, said sensing device operative to transmit one of an ultrasonic wave and an electromagnetic wave toward a reflecting surface disposed along said second end member and receive said one of said ultrasonic wave and said electromagnetic wave reflected off of said reflecting surface to at least partially sense a height condition of said gas spring assembly; and,
 a jounce bumper includes a bumper body supported along said first end member in spaced relation to said second end member and said reflecting surface, said jounce bumper at least partially covering said sensing device along said first end member, said jounce bumper having a longitudinal axis and including:
  a mounting end disposed toward said first end member;
  a distal end spaced apart from said first end member and said second end member;
  an outer surface extending peripherally about said jounce bumper between said mounting and distal ends;
  a sensing passage surface that at least partially defines a sensing passage extending through said bumper body between said mounting and distal ends; and,
  an indexing recess dimensioned to at least partially receive said indexing feature and at least approximately align said sensing passage with said sensing device such that said sensing device transmits said one of said ultrasonic wave and said electromagnetic wave and receives said reflection of said one of said ultrasonic wave and said electromagnetic wave through said sensing passage.

16. A gas spring and damper assembly according to claim 15, wherein said jounce bumper includes an inner surface that at least partially defines a rod passage extending therethrough in approximate alignment with said longitudinal axis and dimensioned to receive said damper rod.

17. A gas spring and damper assembly according to claim 16, wherein said sensing passage extends along said inner surface of said jounce bumper and at least partially forms an elongated groove along said rod passage.

18. A gas spring and damper assembly according to claim 15, wherein said sensing passage surface has one of an approximately cylindrical shape and an approximately frustoconical shape.

19. A gas spring and damper assembly according to claim 15, wherein said jounce bumper includes said bumper body that is at least partially formed from an elastomeric material that substantially inhibits at least one of transmission and reception of said one of said ultrasonic wave and said electromagnetic wave therethrough.

20. A gas spring and damper assembly according to claim 15, wherein said jounce bumper includes a sensing device recess disposed along said mounting end and dimensioned to at least partially receive and cover said sensing device.

* * * * *